Patented July 6, 1937

2,086,239

UNITED STATES PATENT OFFICE 2,086,239

PROCESS OF PREPARING MONOHYDRIC ALCOHOLS

Anderson W. Ralston, William O. Pool, and James Harwood, Chicago, Ill., assignors to Armour and Company, Chicago, Ill., a corporation of Illinois No Drawing. Application February 10, 1936, Serial No. 63,262

10 Claims. (Cl. 260—156)

This invention relates to process of preparing long chain primary aliphatic alcohols containing six or more carbon atoms, such as hexyl alcohol, decyl alcohol, and octadecyl alcohol, and it comprises processes wherein aliphatic nitriles having at least six carbon atoms are reduced to the corresponding amines, and these amines are then treated with a nitrite to convert the amine to the corresponding alcohol; and it further comprises processes wherein primary aliphatic amines containing at least six carbon atoms are treated with a nitrite in acid solution to form alcohol, and the alcohol recovered from the reaction mixture.

In our co-pending Patents Numbers 2,033,536 and 2,033,537, and our application Serial Number 53,650 we described ways of preparing nitriles from fats and fatty acids. We have described ways of preparing nitriles of lower molecular weight from nitriles of higher molecular weight by subjecting the high molecular weight nitriles to pyrolysis, and we have described ways of making nitriles from the higher fatty acids by reacting the acid with ammonia. In these various processes we have had as our object the development of methods by which the cheap and abundant fats and fatty acids can be converted to chemical substances of great utility and economic significance in the arts. As a result of the processes of the aforesaid applications we have been able to prepare, in a practical way, large quantities of alkyl nitriles corresponding to fatty acids of six or more carbon atoms. These nitriles are useful as such in many relations, and they are also valuable starting materials for many chemical processes.

We have now discovered ways of converting such nitriles to alcohols. For example, from caprylic acid we can make caprylonitrile having the formula $C_7H_{15}NC$. From lauric acid we can make lauronitrile; from stearic acid we can make stearonitrile. We can also prepare nitriles from unsaturated acids such as oleic acid. The present invention extends the economic usefulness of our methods of making nitriles in that we have been able to convert such nitriles to their corresponding alcohols readily, and with but little expense. Thus for example, by the processes of the present invention we can convert stearonitrile to octadecyl alcohol, and other nitriles, such as caprylonitrile can be made to yield octyl alcohol. Practically all of the primary aliphatic alcohols containing six or more carbon atoms are relatively rare chemical compounds, although some of the monatomic alcohols, such as cetyl alcohol can be obtained from certain solid animal and vegetable waxes such as spermaceti. These "higher" alcohols are substances which would have many commercial uses were they readily available at a reasonable price. For example, many of them are desirable solvents; they can be used in lacquers and similar coating compositions; they can be sulfated to form valuable wetting agents and emulsifiers; and they are important raw materials for many organic syntheses. However, as stated, most of them, with the exception of a few found in naturally occurring waxes, are, at the present time, largely laboratory curiosities.

As stated, we have discovered ways by which these high molecular weight monatomic alcohols can be prepared from their corresponding nitriles. We have discovered that the nitriles can be reduced by a simple hydrogenation with hydrogen gas in the presence of a hydrogenating catalyst while in acid solution. We have further discovered that the amines thus formed need not be isolated from the reaction mixture before conversion of the amine to its corresponding alcohol. We have discovered that the amine-containing reaction mixture can be treated directly with an alkali metal nitrite such as sodium or potassium nitrite, and that the nitrite will react with such relatively high molecular weight amines to give acceptable yields of higher alcohols. We can, of course, separately prepare the amine from its corresponding nitrile, and then dissolve the amine in an acid, such as hydrochloric, prior to treatment with the nitrite, but on a commercial scale when we wish to make alcohols we ordinarily do not isolate the amine. Hence, in broad aspects, our invention comprises the conversion of primary aliphatic amines containing six or more carbon atoms to their corresponding alcohols by treatment of the amine with an alkali metal nitrite in acid solution. And more specifically our invention includes the conversion of nitriles to amines and then reaction of the amine with the nitrite.

Before proceeding with a more detailed description of our invention we wish to indicate the class of materials with which it is concerned. We can use in our invention any nitriles containing, in the alkyl radical, at least five carbon atoms. Hence, we can start with capronitrile, as the lowest member of the series. Generally the top-most member of the series is stearonitrile but we can of course prepare nitriles from acids higher than stearic. Similarly we can start with many different mixtures of nitriles.

On a commercial scale we find that nitriles prepared from low-grade fatty acids are especially suitable. For example, we can start with a mixture of nitriles prepared from garbage grease fatty acids, lard fatty acids, black cotton seed fatty acids, and many of the other sources of mixed fatty acids. Or we can first distill or fractionate a crude mixture of fatty acid nitriles, as described in our copending application Serial Number 47,716 in order to get individual nitriles. Hence our invention is applicable to the conversion of a mixture of nitriles as well as the pure individual substances. Likewise we can start with mixtures of primary amines as well as the individual amines themselves. For example, we can convert a mixture of lard fatty acid nitriles to a mixture of amines and then either convert this mixture to alcohols or separate the amines and separately treat individual amines of the mixture. We can start with hexyl amine, as the lowest member in the series, or with octadecylamine, most generally the highest member in the series. In many instances, indeed for most purposes, a mixture of alcohols such as a mixture of dodecyl, hexadecyl and octadecyl alcohol is just as useful in the arts as the pure alcohol. Such a mixture can be sulfated to form water-soluble derivatives useful as wetting out agents, and the pure compounds offer no advantages over the mixtures. Accordingly, unless pure alcohols are desired, we practically always start with mixtures of nitriles or mixtures of amines. From the final reaction products the individual alcohols can, of course, be obtained by distillation or otherwise separated.

Hence our invention deals with the treatment of nitriles or amines in which the alkyl radical normally contains from five to eighteen carbon atoms but we can go higher than this if desired. In other words our invention is applicable to the preparation of any monatomic aliphatic alcohol having six or more carbon atoms. It is also applicable to the preparation of unsaturated alcohols corresponding to fatty acids of the oleic, linoleic, and linolenic series.

We shall describe our invention in more specific detail, and as a first example we will refer to the preparation of dodecyl alcohol from lauronitrile. This nitrile can be prepared readily from lauric acid.

The first step in our process comprises the reduction of the nitrile to its corresponding amine. One way of converting the nitrile to its amine consists in dissolving the free amine in alcohol and treating the solution with metallic sodium at room temperature or slightly above under a reflux condenser. We find that this method is generally satisfactory. We have, however, discovered that the nitrile can be catalytically reduced at somewhat less expense by means of hydrogen gas. It is necessary to conduct the hydrogenation in acid solution. Otherwise we find that there is a great tendency for secondary amines to form. Thus, in one advantageous modification of our process we prepare a mixture containing 54 parts by weight of lauronitrile, about 35 parts by weight of concentrated hydrochloric acid, about 100 parts by weight of 95 percent ethyl alcohol, about 1 part by weight of a finely divided platinum catalyst. This mixture is stirred at a temperature of about 50° to 60° C. and under about 50 pounds pressure and hydrogen bubbled in until the absorption of the hydrogen approximates the theoretical required for the reduction of the nitrile. Then the ethyl alcohol is distilled from the reaction mixture and the free amine thrown out of solution by neutralization with sodium hydroxide. The free amine is advantageously extracted with ether and dried. The yield is quite satisfactory, and is of the order of 60 to 75 percent.

The above example gives us dodecyl amine which can be converted to dodecyl alcohol as will presently be described. There are numerous modifications of this reduction method. For example, we can use glacial acetic acid or ordinary straight acetic acid instead of hydrochloric. Likewise we can use sulphuric acid. In the reduction we find it advantageous to have alcohol present since it acts as a solvent for the nitrile and therefore facilitates rapid absorption of hydrogen. The quantity of catalyst used can of course vary over wide limits and apparently the catalyst can be used over and over again indefinitely.

We shall now give further examples of this reduction method. An advantageous reaction mixture through which we bubble hydrogen gas contains about 18 parts by weight of lauronitrile, 8 parts by weight of glacial acetic acid, 35 parts by weight of 95 percent ethyl alcohol and about 0.2 part by weight of a platinum catalyst. At the end of an hour's treatment with hydrogen gas at a temperature of about 50° C. the absorption of hydrogen was approximately theoretical.

We need not always use a solvent such as ethyl alcohol. For example, we can prepare a mixture containing 18 parts by weight of lauronitrile, about 20 parts by weight of concentrated acetic acid and about 0.2 part by weight of the catalyst. Theoretical absorption of hydrogen occurs in about one half hour at 60° C. In another example we prepare a reaction mixture containing 54 parts by weight of dodecyl alcohol, about 100 parts of 95 percent ethyl alcohol, about 15 parts by weight of concentrated sulphuric acid, and about 0.7 part by weight of catalyst. In this case the absorption of hydrogen took somewhat longer.

In all of the above examples it is to be noted that we end up with a final reaction mixture containing dodecyl amine, excess acid, a part of which, of course, forms an amine salt, and catalyst. As pointed out above in one modification of our process we can recover the pure amine from such mixture by first driving off the alcohol solvent, then neutralizing with a base, and final extraction of the free base with ether.

We shall now describe methods of converting the amine to its corresponding alcohol. We shall first refer to the conversion of the pure isolated amine, and then describe a modification wherein we do not isolate the amine but treat the reaction mixture after the reduction with hydrogen directly with a nitrite.

In the first modification we dissolve about 48 parts by weight of dodecyl amine in about 300 parts of 95 percent ethyl alcohol, add about 60 parts of concentrated hydrochloric acid and cool the solution to about 0° C. To this mixture we add a cold solution of 50 parts of sodium nitrite dissolved in 100 parts of water. This mixture is allowed to stand for 1 hour until reaction is complete and is then boiled for a further hour under a reflux condenser. Following this, water is added until the total reaction mixture amounts to about 600 to 650 parts by weight. This causes precipitation of the dodecyl alcohol which can be separated by gravity separation from the reaction mixture. The crude dodecyl alcohol thus obtained is washed with a one to one alcohol water solution containing a small amount of hydrochloric acid to dissolve any unconverted amine which may be present. Finally the alcohol is again washed with hot water and fractionated. The yield is high. In general from 48 parts of amine we obtain 48 parts of alcohol.

Of course it will be understood that in the conversion the acid present in the reaction mixture reacts with the sodium nitrite to liberate nitrous acid which in turn reacts with the amine to convert the amino group to a hydroxy group.

A more advantageous method, and one which we find desirable when starting with nitriles, is to treat the reaction mixture containing the amine directly with a nitrite. Thus for example, we reduce lauronitrile in concentrated hydrochloric acid solution containing a platinum catalyst and ethyl alcohol solvent, as in the first specific example given above, filter off the platinum catalyst and then add additional alcohol and additional concentrated hydrochloric acid, cool to about 0° C., and add an aqueous solution of the nitrite. In this manner we avoid the necessity for extracting and purifying the dodecyl amine prior to treatment with nitrite. The crude reaction mixture from the reduction of the nitrile may contain quantities of unreduced nitrile, but their presence is not a disadvantage.

An example of this method of proceeding is as follows: We prepare a mixture containing about 50 parts by weight of lauronitrile, 30 parts by weight of concentrated hydrochloric acid, 100 parts by weight of 95 percent ethyl alcohol, and about 1 part by weight of a platinum catalyst. Hydrogen is bubbled in at a moderately elevated temperature, about 50° C., until approximately theoretical absorption has occurred. The mixture is then filtered to remove the platinum catalyst, about 100 parts of ethyl alcohol and about 30 parts of concentrated hydrochloric acid added and the solution cooled to approximately 0° C. A cold solution composed of about 35 parts of sodium nitrite dissolved in 75 parts of water is then added, the mixture allowed to stand for about 1 hour and finally boiled under a reflux to complete the reaction. Additional water is then added and the alcohol separated as a layer from the hot solution. The product is then washed with an aqueous solution containing ethyl alcohol and a small amount of hydrochloric acid to remove impurities, and finally washed with hot water.

As we have pointed out above our process is more usually applied to the treatment of crude mixtures of nitriles or amines. These mixtures, as stated, can be obtained from mixtures of fatty acids such as lard fatty acids, brown grease fatty acids, garbage grease fatty acids and others. When using such materials we proceed in substantially the same way as we have described above for pure dodecyl alcohol. Of course it will be understood that the amount of acid such as hydrochloric, glacial acetic, or sulphuric admixed with the nitrile prior to reduction will vary depending on the kind and quantity of nitrile used. The guiding principle is that enough acid must be present to insure the formation of primary amines rather than secondary amines in the reduction. In general, we always have considerably more acid present than is necessary to react with the amine to form an amine salt. As long as an excess is present the reduction will proceed in the desired direction and we do not believe that large excesses of mineral acid are undesirable. Likewise we find it best to have a solvent such as ethyl alcohol present in the reaction mixture but we have given examples above where it has been omitted. The quantity of platinum catalyst or other hydrogenation catalyst can vary over wide limits and the temperature is advantageously about 50° C. but this is subject to reasonable variation. Accordingly, when dealing with the reduction of mixtures of nitriles obtained from the sources stated it is to be expected that some slight experimentation will be done in order to determine the optimum quantities of ingredients to give the best yields of amine. After the reduction of the mixture of nitriles, the amine-containing reaction product can be treated directly with a nitrite as we have described above, or the free amine mixture can first be isolated, or we can isolate the mixture of amines, fractionate the free bases obtained and then convert the individual amines to substantially pure individual higher alcohol.

When directly converting the amine containing reaction mixture to alcohol we find it best to add further quantities of a solvent such as ethyl alcohol and further quantities of mineral acid. Here again exact quantities cannot be stated and it is to be expected that those skilled in the art will conduct preliminary tests in order to determine the optimum quantities of added ethyl alcohol and mineral acid. In general it can be said that an excess of these two substances is not undesirable but for economic reasons and expense of recovering the solvent minimum quantities should be used. The guiding principle here is that during the treatment with nitrite the reaction mixture should be substantially homogenous and there should be no separation of any amine. This is simply to insure satisfactory operation conditions.

The mixture of higher alcohols finally obtained can be fractionated when it is desired to obtain pure constituents. These alcohols having fairly wide differences in boiling points and fractionation under reduced pressure is advantageous.

The nitrites which we use are most generally alkali metal nitrites such as sodium or potassium. We can use alkaline earth metal nitrites but they are more costly. We do not, of course, find it desirable to use expensive sources of nitrous acid such as silver nitrite, although silver nitrite has been suggested in the past as an academic reagent for the conversion of simple amines to alcohols.

We shall now give a more specific example starting with a mixture of lard fatty acid nitriles. This mixture will contain nitriles derived from stearic, palmitic and oleic acid.

About 100 parts by weight of the nitrile mixture is dissolved in an aqueous solution containing about 50 parts of hydrochloric acid and 200 parts of ethyl alcohol. Two parts of platinum catalyst are added, the mixture heated to about 50° C. with stirring, and hydrogen bubbled in. After approximately three hours' hydrogenation, the reaction mixture is allowed to cool and about 30 parts of concentrated hydrochloric acid and 100 parts of ethyl alcohol added. The mixture is then cooled down to about 0°-5° C. and an aqueous solution composed of 75 parts of sodium nitrite and 200 parts of water are added. This is allowed to stand for about an hour and then boiled under a reflux for a further hour. Some mixed alcohols separate after the boiling operation and the remainder can be thrown out of solution by further dilution with water. Finally the mixed alcohols, mostly octadecyl and octadecenyl (corresponding to stearic and oleic acids) are separated as a layer and purified as described above for dodecyl alcohol.

It will, of course, be obvious that our invention is susceptible to many modifications.

Having thus described our invention what we claim is:

1. The process of preparing aliphatic monohydric alcohols of at least six carbon atoms which comprises converting an alkyl nitrile having at least six carbon atoms to its corresponding amine and then treating the amine, while in acid solution, with a nitrite of an alkali-forming metal.

2. The process of preparing a mixture of aliphatic monohydric alcohols of at least six carbon atoms which comprises converting a mixture of alkyl nitriles of at least six carbon atoms to their corresponding amines and then treating the amines, while in acid solution with an alkali metal nitrite.

3. The process as in claim 2 wherein the nitriles are lard fatty acid nitriles.

4. The process of preparing an aliphatic monohydric alcohol which includes treating an alkyl amine having at least six carbon atoms, while in acid solution, with a nitrite of an alkali-forming metal.

5. The process of preparing a mixture of aliphatic monohydric alcohols which includes treating a mixture of alkyl amines having at least six carbon atoms, while in acid solution, with an alkali metal nitrite.

6. The process as in claim 5, wherein the mixture of alkyl amines includes octadecylamine and octadecenylamine.

7. The process of preparing octadecyl alcohol which comprises converting stearonitrile to octodecylamine and then treating the amine, while in acid solution, with a nitrite of an alkali-forming metal.

8. The process of preparing octadecyl alcohol which comprises converting stearonitrile to octadecylamine and then treating the amine, while in acid solution, with sodium nitrite.

9. The process of preparing octadecyl alcohol which includes treating octadecylamine with an alkali-forming metal nitrite in acid solution.

10. The process as in claim 9 wherein the nitrite is sodium nitrite.

ANDERSON W. RALSTON.
WILLIAM O. POOL.
JAMES HARWOOD.